Patented Oct. 24, 1950

2,526,776

UNITED STATES PATENT OFFICE 2,526,776

REMOVAL OF HYDROGEN FLUORIDE AND SILICON TETRAFLUORIDE FROM GASES

Lee B. Smith, Woodbridge, N. J., and John D. Calfee, Manhasset, N. Y., assignors to Allied Chemical & Dye Corporation, New York, N. Y., a corporation of New York No Drawing. Application October 19, 1948, Serial No. 55,423

7 Claims. (Cl. 23—154)

This invention relates to the separation of hydrogen fluoride (HF) and silicon tetrafluoride ($SiF_4$) from gases containing the same, and is directed particularly to the purification of HCl gases containing HF and/or $SiF_4$ as fluorine impurities.

The fluorine compounds HF or $SiF_4$ or mixtures thereof often exist as impurities in industrial gas streams containing constituents recoverable as products or by-products. In order to render such constituents marketable, it is usually necessary to remove the fluorine impurity or reduce its concentration to a low value. While the principles of this invention are applicable to the separation of HF and/or $SiF_4$ from any suitable gas or gas mixture containing these compounds as impurities, the present improvements relate particularly to the separation of these impurities from gases containing HCl. For example, HCl gases which may be formed either as the principal product or as by-product in certain industrial operations, frequently contain various amounts of HF impurities. Further, HF is readily converted to $SiF_4$ by contact with well-known silicon compounds reactive therewith and to which such HCl gases may be exposed. In particular, by chlorinolysis (high temperature exhaustive chlorination resulting in the rupture of the carbon to carbon bond) of 1,1-difluoroethanes such as ethylidene fluoride, chloro- and chlorofluoro-methanes are obtained as primary sought-for products and in addition considerable quantities of HCl by-product are formed. This HCl may, under some operating conditions be contaminated with small but seriously objectionable amounts of HF. After condensation of some of the higher boiling condensable materials egressing the chlorinolysis reaction, the remaining uncondensed gaseous product, composed essentially of HCl and volatile halogeno-alkanes and halogeno-alkenes, may contain as much as 0.6% by volume or more of HF, depending upon particular conditions. In order to make such HCl marketable for general purposes, adequate reduction in fluorine concentration is usually required. Methods for the removal of HF and $SiF_4$ must be inexpensive because the HCl itself is a relatively low cost product.

Previously known methods for removing HF from gases containing the same have comprised adsorption with agents which react chemically with the HF, e. g. sodium fluoride. This material is of no value whatsoever in separating HF from HCl since the HCl itself reacts with the sodium fluoride, thereby liberating HF. Other methods employ complicated aqueous absorption and/or distillation procedures. The aqueous liquid phase operation and relatively high temperatures which such methods frequently involve often lead to aggravated corrosion problems and other disadvantageous characteristics. Further, the HCl gas stream may contain, in addition to the HF impurity, organic compounds which may undergo chemical decomposition or condensation reactions at elevated temperatures in the presence of absorbent for the HF or $SiF_4$. Accordingly, these considerations must be kept in mind in the determination of an absorbent or purifying agent. Finally, in previously known procedures, it has been mandatory to keep concentrations of silicon in the system at a minimum to prevent reaction of HF therewith and the consequent escape of fluorine from the absorbent as volatile $SiF_4$. It would be desirable, is possible to avoid requirement of absence of silicon.

In general, an object of this invention is to devise procedures for removing HF and/or $SiF_4$ from gases containing the same. A further object is the provision of economical methods for reducing fluorine content of completely gas phase materials at normal temperature and pressure. A more particular object is to provide for fluorine purification of gas phase HCl mixtures by procedures which do not promote polymerization, chlorination, or decomposition of other organic materials which may be present with the HCl. A still further object is to provide procedures in which the presence of silicon does not interfere with the removal of fluorine. Other objects and advantages will appear hereinafter.

We have discovered that HF or $SiF_4$ or mixtures of the same may be selectively removed from other gases by contacting such gases with fuller's earth. In purifying a gas according to a preferred embodiment of our invention, the stated objects may be realized by passing the gas, comprising the fluorine compound impurity, under suitable gas-solid contacting conditions into and thru a body of fuller's earth, whereupon the impurity content, consisting of HF or $SiF_4$ or both, is selectively removed and held by the fuller's earth and thereby separated from the gas stream. Particular embodiments of our invention comprise so treating and purifying HCl gases containing fluorine impurity. Our discovery is astonishing since it would be expected from prior art teaching that HF would react with the silicon of the aluminum silicate to form volatile $SiF_4$, and thereby prevent retention of fluorine. In the case in which HCl gases are treated, it might be expected that HCl would displace fluorine compounds from or prevent their retention by the fuller's earth, or otherwise impair the functioning of the purifying agent. We have found that no such reactions interfere with our purification procedure. The enhanced fluorine removal is obtained according to our invention by treatment with inexpensive and readily available substances and with a minimum of risk of chemical decomposition or condensation of organic materials which might be mixed with HCl. Specifically, halogeno-alkenes mixed with chlorinolysis by-product HCl are not noticeably affected by our fuller's earth purifying agent. The operation of our process at normal pressure and at relatively low temperatures are further advantageous features, affording simplicity of operation at a minimum cost.

The purification process of the invention is particularly applicable to the treatment of gases containing the indicated fluorine impurities and substantial amounts of HCl, e. g. 10% and upward by volume, and preferably gases containing a major portion of HCl by volume.

As stated above, by-product HCl gases recovered from chlorinolysis of ethylidene fluoride may, in some circumstances, contain around 0.6% HF by volume. This is typical of HF contaminated HCl gases produced in certain types of industrial processes which gases may contain fluorine compound impurity in amount equivalent to from 0.1% up to 0.6% and more of HF by volume (NTP). On the other hand, gases, containing little or no HCl, may contain these fluorine impurities in amounts equivalent to 2% or more of HF by volume. In general, this invention is directed to the treatment of gases containing the fluorine compound impurities noted in amounts equivalent to appreciably more than 0.1% by volume of HF. As to all gases purifiable by the procedures of the invention, we normally operate the present improved procedures to form gases having a fluorine compound impurity content equivalent to less than 0.1% and desirably to less than 0.01% by volume of HF. Preferably, and particularly in the treatment of gases containing the indicated fluorine impurities and substantial quantities of HCl, and where stringent specifications require still lower fluorine content, we proceed so as to produce HCl gases of fluorine content equivalent to not more than 0.006% by volume of HF.

Fuller's earth is a form of hydrous aluminum silicate mineral well known in the chemical and related arts. Its chemical composition and physical structure may vary depending upon the particular locality in which it is mined, but general characteristics of the material include a structure of agglomerated, slender, needle-like crystals of electron microscopical size and a ratio of silica to alumina substantially higher than the bentonitic and kaolinitic types of aluminum silicates, i. e. as high as 4 to 1 and above. We propose the use of any of these various forms of fuller's earth as purifying agents for removal of fluorine according to our invention. The agent is preferably employed in the form of granules or pellets of a size suitable to the size of equipment and scale of operation. Due to the fine needle-like structure of our purifying agent, it possesses an extended surface area which aids in efficency of removal of fluorine compounds. We also find that most advantageous results are obtained when the agent contains minimum free water, and therefore prefer to dehydrate the agent. In dehydrating fuller's earth, it is desirable to avoid temperatures which cause deterioration of the material. Means for effecting such dehydration are known. Most preferably, however, when purifying gaseous HCl compositions, we dehydrate purifying agent by passing the gaseous composition over the fuller's earth for a time sufficient to effect the desired removal of water. In this procedure, the heat generated upon contact of the HCl with the fuller's earth causes evaporation and removal of the water.

The temperatures employed are those which effect the desired removal of HF and SiF$_4$ from the carrying gas stream. As heretofore indicated, it is a particular advantage of our procedure that materials may be purified at temperatures which are not high preferably at normal, i. e. room temperature. When purifying gaseous compositions, condensation of liquid on the purifying agent causes obstruction of the surface, and consequent decrease of efficiency of removal of fluorine compounds. Accordingly, in our preferred process, it is important to maintain the agent in a dry condition and unwetted by liquid material. This may be accomplished by preliminarily, if necessary, removing from the gas stream to be treated all constituents condensable at the treatment temperature contemplated, or by maintaining the temperature, at which the treating operation is carried out, above that at which the less volatile materials in the gas condense. Hence, in the preferred embodiment, the purification treatment is a gas-phase operation. We find that at temperatures as low as 20–25° C. satisfactory absorption of HF and SiF$_4$ is usually obtained. Temperatures should be maintained below those at which there is insufficient absorption of fluorine compounds or decomposition of organic material mixed with the HCl gas. At 100° C. noticeable decrease in effectiveness of absorbing agent occurs and accordingly temperatures substantially above 100° C. are ordinarily not employed. We prefer to operate at temperature of about 70° C. or below.

For removal of HF and SiF$_4$ according to our invention, the pressure may be maintained at any value at which the desired degree of absorption of these compounds by the fuller's earth is obtained. Although, as heretofore indicated, it is an advantage of our process that effective removal of fluorine compounds may be realized at ordinary (i. e. atmospheric) pressure, if desired or expedient, the process may be operated at elevated or reduced pressure.

Our preferred purification method is conveniently carried out by continuously introducing gas to be purified into a zone containing fuller's earth, contacting the gas with purifying agent under appropriate conditions particularly conditions of time of exposure to the action of the purifying agent, and continuously withdrawing the effluent gas from the zone. Two or more zones in series forming a purification unit may be employed, the last zone in the direction of flow containing the most active agent. When desirable or necessary to replace the agent in any zone, the gas flow is stopped to permit recharging with fresh agent. If, as preferred, two or more purification units are operated in parallel, while one is being recharged with fresh agent, the flow of gas thru the others may be continued and uninterrupted operation thereby obtained.

When fluorine impurity in the particular gas undergoing treatment includes a substantial amount of HF, one embodiment of our invention comprises first converting the HF to SiF$_4$ by contacting the mixture with an inorganic oxygenated silicon compound reactive at about room temperature with HF, under suitable contacting conditions, e. g. at about room temperature and for time interval long enough to secure effective contact gas and solid. Silica gel, glass wool, or other forms of silica which are known to be reactive with HF at about room temperature may be employed for this purpose. The resulting gas stream containing $SiF_4$ and any unreacted HF is subsequently contacted with the fuller's earth which removes the $SiF_4$ from the mixture. This pretreatment with silicon compound is desirable since in some circumstances it appears that the fuller's earth purifying agent is markedly effective in removing fluorine when the fluorine is in the form of $SiF_4$. The silicon compound may be mixed with and form a part of the mass of fuller's earth agent or may be disposed as a separate mass in the treatment zone. Adopting this pretreatment modification, one embodiment of our invention comprises continuously introducing the gas to be purified into a zone containing inorganic oxygenated silicon compound reactive at about room temperature with HF, and fuller's earth, contacting the gas with the silicon compound and with the fuller's earth in the zone for time sufficient to effect substantial conversion of HF to $SiF_4$ by the silicon compound and absorption of $SiF_4$ by the fuller's earth, and continuously withdrawing the purified gaseous product from the zone.

The gas stream to be purified is maintained in contact with the fuller's earth for a time sufficient to effect removal of fluorine compounds. In a continuous process, the space velocity per hour or rate of passage of the gas stream thru the body of treating agent is regulated, in accordance with the particular operating conditions at hand, so as to maintain each increment of gas in contact with the treating agent for a time interval sufficient to effect the degree of impurity removal desired, i. e. to reduce fluorine compound impurity content to the equivalent of less than 0.1%, desirably to less than 0.01%, and in the best embodiments to not more than 0.006% by volume of HF. Space velocity per hour indicates volumes of reactant gas at room temperature per volume of reaction space per hour. The optimum space velocity may depend upon particular operating conditions, e. g. size and shape of reaction zone, amount and type of purifying agent, amount of impurities present in the gas composition, temperature, pressure, etc., and importantly, the degree of purification required in any given operation. While the complex nature of the process mechanism and the permissible variables just indicated make it impractical to specify optimum time of contact for all operating conditions, we find that in order to obtain good purification for most purposes, space velocity per hour should be maintained below about 125. With judicious control of temperature, appreciable loss by reaction of organic material normally present in chlorinolysis by-product HCl compositions is avoided even at prolonged time of contact. Accordingly, the maximum time of contact or minimum space velocity is determined generally by desired capacity of equipment and other economic considerations.

Due to its complexity, the mechanism by which our fuller's earth agents effect purification of HCl compositions is somewhat obscure. Accordingly, we do not wish to limit ourselves to any particular theory. However, it is our belief that the constituents of fuller's earth react chemically with the HF and $SiF_4$ thereby retaining the fluorine compounds and preventing their displacement by the HCl and escape with the main stream of purified HCl material.

The following examples illustrate our invention, the parts being by weight:

Example 1.—A mixture from the high temperature chlorinolysis of ethylidene fluoride ($CH_3$—$CHF_2$) (after cooling to about minus 20° C. to condense out $C_2Cl_4$ and $CCl_4$) consisting of approximately 35% lower alkyl halides, approximately 65% HCl and 0.6% HF (all by volume) was passed into and thru a tower containing about 450 parts of fuller's earth (so-called Attapulgus Fuller's Earth) maintained at about 30° C. and at about atmospheric pressure. The space velocity per hour was about 100. Operation was continued for a total of 23 hours, during which time approximately 23 parts of HF were introduced into the tower. The HF content of the HCl gas effluxing the tower averaged about 0.002% by volume. The HCl gas was passed into an HCl absorber of conventional construction, and 20° Bé. muriatic acid recovered from the treated gas contained 0.0006% HF by weight.

Example 2.—Nitrogen gas containing 1.82% HF by volume was passed thru a fuller's earth tower of the type described in Example 1 containing 450 parts of fuller's earth, maintained at a temperature of about 30° C. and at about atmospheric pressure. After 4 hours of this operation during which time 5.2 parts of HF had been introduced into the tower, the gas flowing from the tower contained 0.00024% HF by volume; after 6½ hours (8.4 parts HF introduced) the HF content of the gas flowing from the tower was 0.0013% by volume; and after 12 hours (15.5 parts HF introduced) the HF content was 0.00085% by volume. Average space velocity per hour during the total run was about 100.

Example 3.—In this run, a gas mixture the same as employed in Example 1 was passed first thru a pretreating tower containing about 300 parts of silica gel. The temperature in the tower was maintained at about 30° C. The exit gas of the tower, containing most of the fluorine impurity as $SiF_4$, was then passed into and thru the fuller's earth tower used in Example 1. Pressure in both towers was about atmospheric, and space velocity per hour thru the fuller's earth tower was about 100. Operation was continued for a period of about 5 hours during which time approximately 5 parts of HF were passed thru the silica gel and fuller's earth towers. The HF content of the HCl containing gas exiting the fuller's earth tower averaged about 0.004% by volume.

We claim:

1. The process for reducing the fluorine content of a gas stream containing by volume a major portion of HCl and, as fluorine compound impurity, material of the group consisting of HF, $SiF_4$ and mixtures thereof, which process comprises passing said gas stream, while wholly in the gas phase and at temperature not more than 70° C., thru a body of fuller's earth, and regulating the rate of passage of said gas stream thru said body so as to reduce the fluorine content of said stream to equivalent to not more than 0.006% by volume of HF.

2. The process of reducing the fluorine content of an HCl gas containing HF as an impurity which process comprises contacting said gas with an inorganic oxygenated silicon compound reactive at about room temperature with HF thereby to convert said HF to $SiF_4$ to form a resulting gas comprising $SiF_4$, and contacting said resulting gas with fuller's earth at a temperature low enough and for a period of time sufficient to effect substantial selective removal of said $SiF_4$ from said resulting gas.

3. The process for reducing the fluorine content of an HCl gas containing, as fluorine compound impurity, material of the group consisting of HF, $SiF_4$ and mixtures thereof, which process comprises contacting said gas with fuller's earth at temperature low enough and for a period of time sufficient to reduce the fluorine content of said gas to equivalent to less than 0.1% by volume of HF.

4. The process for reducing the fluorine content of an HCl gas containing, as fluorine impurity, material of the group consisting of HF, $SiF_4$ and mixtures thereof, which process comprises passing a stream of said gas, at temperature not more than 100° C., through a body of fuller's earth, and regulating the rate of passage of said gas through said body so as to reduce the fluorine content of said stream to equivalent to less than 0.01% by volume of HF.

5. The process for reducing the fluorine content of a gas comprising HCl, halogenated organic material and, as fluorine compound impurity, material of the group consisting of HF, $SiF_4$ and mixtures thereof, which process comprises contacting said gas, while wholly in the gas phase, and at temperature not more than 100° C., with fuller's earth for a period of time sufficient to reduce the fluorine content of said gas to equivalent to less than 0.01% by volume of HF.

6. The process for reducing the fluorine content of an HCl gas containing HF as an impurity, which process comprises passing a stream of said gas through a body of an organic oxygenated silicon compound reactive at about room temperature with HF under conditions to convert said HF to $SiF_4$ to form a resulting gas comprising $SiF_4$, and passing a stream of said resulting gas through a body of fuller's earth, at temperature not more than 100° C., and regulating the rate of passage of said gases through each of said bodies so as to reduce the fluorine content of said resulting gas stream to equivalent to less than 0.1% by volume of HF.

7. The process for reducing the fluorine content of a gas stream containing by volume a major portion of HCl and HF as impurity, which process comprises passing said gas stream through a body of an inorganic oxygenated silicon compound reactive at about room temperature with HF under conditions to convert said HF to $SiF_4$ to form a resulting gas comprising $SiF_4$, and passing a stream of said resulting gas, while wholly in the gas phase and at temperature not more than 70° C., through a body of fuller's earth, and regulating the rate of passage of said gas streams through each of said bodies so as to reduce the fluorine content of said resulting gas stream to equivalent to not more than 0.006% by volume of HF.

LEE B. SMITH.
JOHN D. CALFEE.

REFERENCES CITED

The following references are of record in the file of this patent:

UNITED STATES PATENTS

| Number | Name | Date |
| --- | --- | --- |
| 1,782,808 | Cross | Nov. 25, 1930 |
| 1,936,078 | Adamson | Nov. 21, 1933 |
| 2,196,246 | Brown et al. | Apr. 9, 1940 |
| 2,389,457 | Pines et al. | Nov. 20, 1945 |
| 2,454,615 | Ridgway et al. | Nov. 23, 1948 |